(12) United States Patent
Yoshizawa et al.

(10) Patent No.: US 8,705,559 B2
(45) Date of Patent: Apr. 22, 2014

(54) COMMUNICATION APPARATUS, COMMUNICATION METHOD, AND INTEGRATED CIRCUIT

(75) Inventors: Kensuke Yoshizawa, Fukuoka (JP); Youhei Koide, Fukuoka (JP); Shunsuke Nagayasu, Fukuoka (JP); Yoshio Urabe, Fukuoka (JP)

(73) Assignee: Panasonic Corporation, Osaka (JP)

( * ) Notice: Subject to any disclaimer, the term of this patent is extended or adjusted under 35 U.S.C. 154(b) by 665 days.

(21) Appl. No.: 12/270,671

(22) Filed: Nov. 13, 2008

(65) Prior Publication Data

US 2009/0122807 A1 May 14, 2009

(30) Foreign Application Priority Data

Nov. 14, 2007 (JP) ................................. 2007-295684

(51) Int. Cl.
*H04B 7/212* (2006.01)
*H04W 74/08* (2009.01)
*H04L 12/413* (2006.01)

(52) U.S. Cl.
CPC ......... *H04W 74/0816* (2013.01); *H04L 12/413* (2013.01)
USPC ...................................................... 370/442

(58) Field of Classification Search
CPC .................... H04W 74/0816; H04L 12/413
USPC ................................................ 370/443–450
See application file for complete search history.

(56) References Cited

U.S. PATENT DOCUMENTS

| 5,319,641 | A | 6/1994 | Fridrich |
| 6,519,263 | B1 | 2/2003 | Huth |
| 7,095,754 | B2 | 8/2006 | Benveniste |
| 7,136,932 | B1 | 11/2006 | Schneider |
| 2003/0081628 | A1 | 5/2003 | Sugar |
| 2004/0233927 | A1* | 11/2004 | Hirosawa ..................... 370/445 |
| 2005/0025167 | A1* | 2/2005 | Ishibashi et al. ............. 370/412 |
| 2005/0089045 | A1* | 4/2005 | Shim et al. .............. 370/395.42 |
| 2005/0129036 | A1* | 6/2005 | Sawabe ........................ 370/401 |
| 2005/0141547 | A1 | 6/2005 | Cho |

FOREIGN PATENT DOCUMENTS

| EP | 1 179 919 | 2/2002 |
| WO | 2004/038980 | 5/2004 |

OTHER PUBLICATIONS

International Search Report dated Feb. 20, 2009.

* cited by examiner

*Primary Examiner* — Mark Rinehart
*Assistant Examiner* — Maharishi Khirodhar
(74) *Attorney, Agent, or Firm* — Seed IP Law Group PLLC

(57) ABSTRACT

A communication apparatus is connected to a transmission channel capable of transmitting a plurality of kinds of data, each kind of data having different priority levels. The apparatus includes: an acquisition section which acquires each priority information of each kind of data on the transmission channel; and a transmission controller that, when transmitting data having a predetermined priority are transmitted from the communication apparatus, controls a time from a predetermined transmission reference time to a transmission end time of the transmitting data in accordance with the priority information.

23 Claims, 11 Drawing Sheets

FIG.7A

PRIORITY LEVEL 7: ASSIGNED
PRIORITY LEVEL 6: ASSIGNED
PRIORITY LEVEL 5: NONE
PRIORITY LEVEL 4: NONE
PRIORITY LEVEL 3: ASSIGNED
PRIORITY LEVEL 2: NONE
PRIORITY LEVEL 1: NONE
PRIORITY LEVEL 0: NONE

FIG.7B

PRIORITY LEVEL 7: NONE
PRIORITY LEVEL 6: ASSIGNED
PRIORITY LEVEL 5: NONE
PRIORITY LEVEL 4: NONE
PRIORITY LEVEL 3: ASSIGNED
PRIORITY LEVEL 2: NONE
PRIORITY LEVEL 1: NONE
PRIORITY LEVEL 0: NONE

FIG.7C

PRIORITY LEVEL 7: NONE
PRIORITY LEVEL 6: NONE
PRIORITY LEVEL 5: NONE
PRIORITY LEVEL 4: NONE
PRIORITY LEVEL 3: ASSIGNED
PRIORITY LEVEL 2: NONE
PRIORITY LEVEL 1: NONE
PRIORITY LEVEL 0: NONE

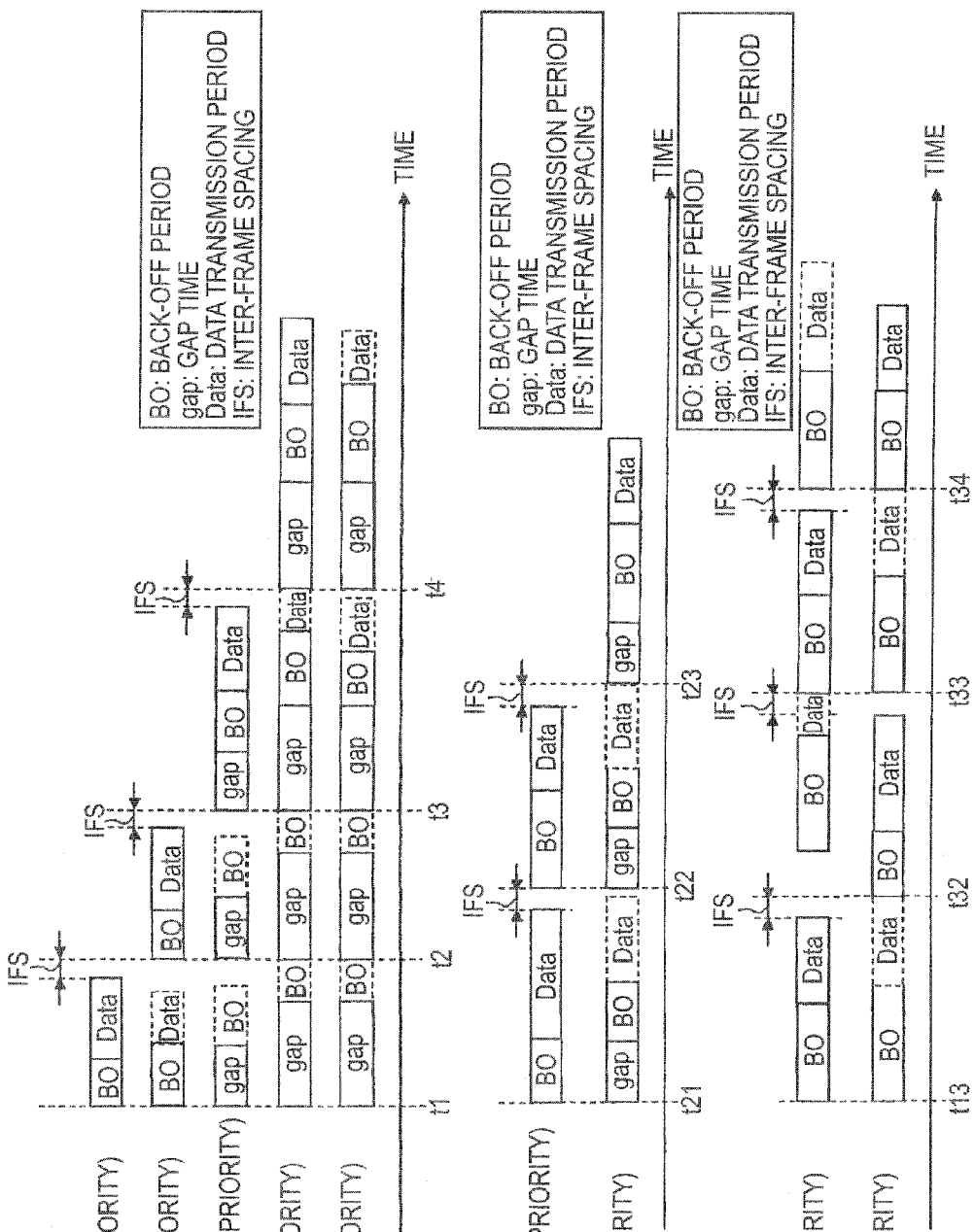

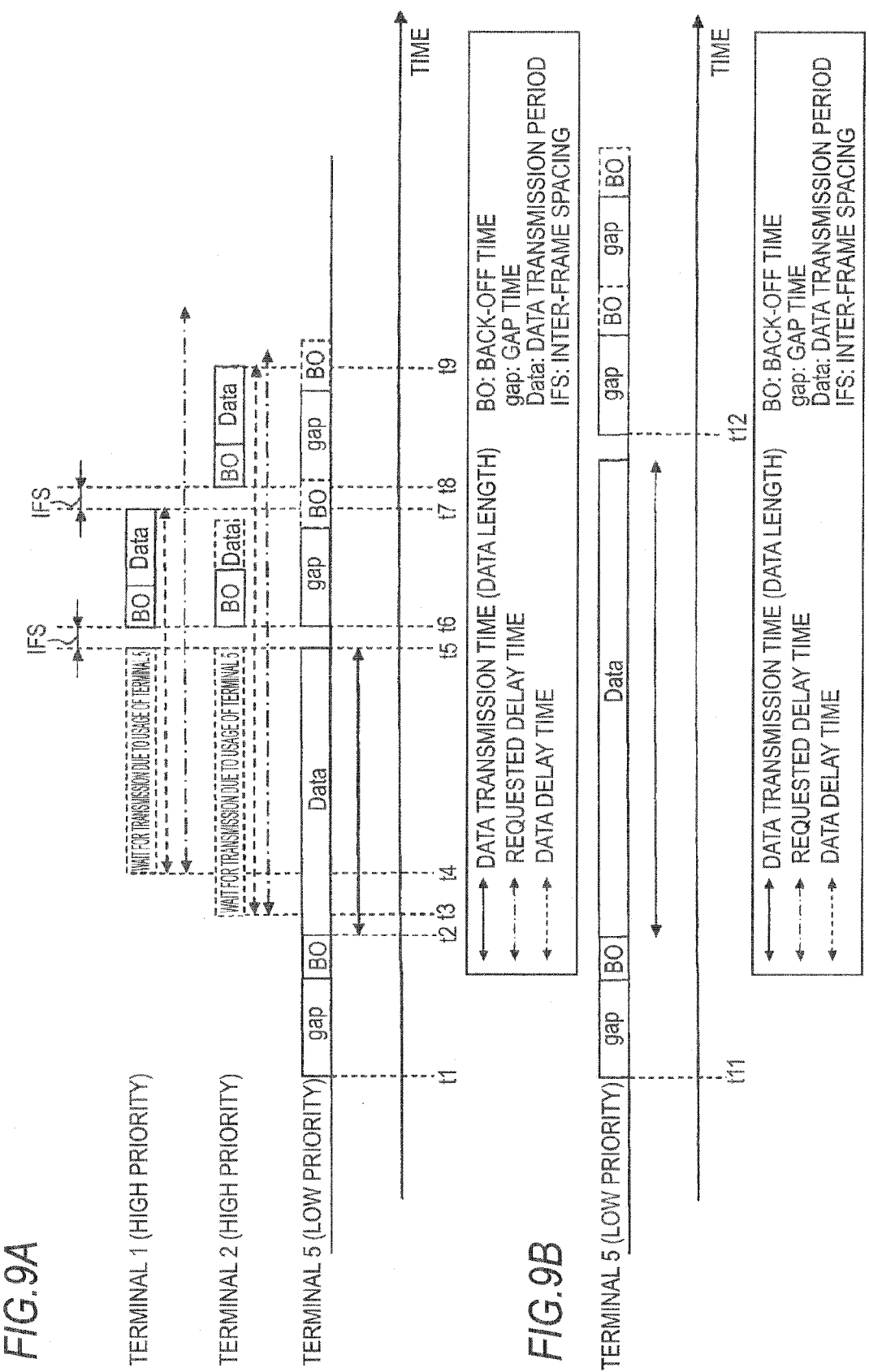

COMMUNICATION APPARATUS, COMMUNICATION METHOD, AND INTEGRATED CIRCUIT

BACKGROUND

1. Technical Field

The present invention relates to a communication method for establishing communication among a plurality of communication apparatuses sharing a communication band and to a communication apparatus and an integrated circuit therefor.

2. Background Art

In a communication system that establish communication among a plurality of communication apparatuses sharing a communication band, such as power line communication, a wireless LAN (Local Area Network), and the like, the plurality of communication apparatuses perform communication by use of one transmission channel, and hence congestion among accesses from the plurality of communication apparatuses must be avoided.

One of the methods is a CSMA (Carrier Sense Multiple Access) scheme. Under the scheme, respective communication apparatuses monitor usage conditions of the transmission channel and perform transmission when another communication apparatus does not use the transmission channel (when the transmission channel is in an idle state). When it is detected that another communication apparatus does not use the transmission channel, transmission is commenced after elapse of a random wait time (a back-off time).

FIG. 10 shows an example of timing at which data are transmitted under the CSMA scheme. When the communication apparatus A transmits a packet PA1 at time T1, a communication apparatus B connected to the same transmission channel (a same network) detects the packet PA1 at time T2 achieved after a lapse of a carrier detection time Ct, thereby detecting that the transmission channel is in use. When the communication apparatus B attempts to perform transmission by way of the transmission channel, the communication apparatus B waits end of the packet PA1 from the communication apparatus A.

When end of transmission of the packet PA1 performed by the communication apparatus A is detected at time T3, the communication apparatus B remains on standby for a period of time (a random back-off time) that is a random multiple of a unit back-off time (a slot time) St. Specifically, when counting is performed each time a slot time St elapses and when the counted value reaches a random value generated at that time, a packet PB1 is transmitted. An example shown in FIG. 10 is a case where a random value assumes a value of 8, and the packet PB1 is transmitted at time T4 achieved after the communication apparatus B has remained on standby for St×8. The slot time St is set to a value that is equal to or greater than the carrier detection time Ct. Therefore, when another communication apparatus for which a small random value has arisen starts transmission, commencement of transmission of another communication apparatus can be detected without fail before counting of slots.

In the example shown in FIG. 10, a carrier is not detected until the random value 8 is counted; hence, the communication apparatus B can transmit a packet PB1. However, when there is another communication apparatus for which a random value smaller than eight has arisen, a carrier is detected before time T4 is achieved, and counting is stopped. The communication apparatus B waits until a packet of the other communication apparatus is completed. A method for generating a random value does not need to be constant, and the maximum value of the random value that arises in accordance with a priority level may also be changed. For instance, when the maximum value is increased at the time of re-transmission (the random value returns to the original maximum value when re-transmission is successful) or when counting is stopped by detection of a carrier of another communication apparatus during standby, it is possible to avoid a continued state where one communication apparatus cannot perform communication, by means of decreasing the maximum value (the random value returns to the original maximum value when transmission is successful). A point at time T3 at which transmission of the packet PA1 of the communication apparatus A is completed is taken as a point in time achieved when an IFS (an inter-Frame Space) defined in IEEE802.11 standards elapses from when a carrier is not detected.

As mentioned above, as a result of the CSMA scheme being adopted, even when a plurality of communication apparatuses attempt to perform transmission by way of a single transmission channel, commencement of transmission is made possible after elapse of a random back-off time that is a random wait time, so that the chance of a collision can be reduced. The random back-off time will often be hereinafter described as a "back-off time," a "back-off period," or a "BO."

In the meantime, in a communication system that establish communication among a plurality of communication apparatuses sharing a communication band, such as power line communication and a wireless LAN (Local Area Network), assurance of QoS (Quality of Service) is required even when a variety of kinds of data are mixedly present in a transmission channel. In particular, in the case of stream transfer of data that are to be transmitted and that are cyclic and subjected to limitations of delay conditions; for instance, VoIP (Voice on Internet Protocol) and a video, an interruption arises in data when fluctuations are present in a communication band; hence, it is required to perform transmission while a sufficient communication band is assured.

However, the CSMA scheme is basically a scheme for making an access after elapse of a random back-off time, the chance of a successful access will be reduced if the number of apparatuses that make an access (the number of communication apparatuses connected to a network) is increased, and it becomes difficult to assure the maximum delay for data, such as that being subjected to limitations of delay conditions.

A priority control technique for ensuring QoS is; for instance, a wireless LAN technique (IEEE802.11e) described in U.S. Pat. No. 7,095,754. The technique described in the document is for inserting a gap time (hereinafter often described simply as "gap"), which is a fixed wait time, between frames separately from the back-off time. Since the gap time changes according to a priority level of transmitting data (the time is short in the case of a high priority level but long in the case of a low priority level), high-priority data can be reliably transmitted by priority.

FIGS. 11A and 11B show examples of timings for a case where data are transmitted while a gap time whose length changes according to a priority level of the data is added to the data. In an example shown in FIGS. 11A and 11B, a priority level of transmitting data includes three stages: namely, a high priority, a normal priority, and a low priority, and a gap time for the case where the priority level is a high priority is zero. When the priority level is a "normal priority" and a "low priority," a gap time is set; however, the gap time is set such that a gap time for the case where the priority level is a low priority becomes longer than a gap time for the case where the priority level is a normal priority.

In the example shown in FIG. 11A, terminals 1 and 2 are about to transmit "high priority" data; a terminal 3 is about to transmit "normal priority" data; and terminals 4 and 5 are about to transmit "low priority" data. When an idle state of the transmission channel is detected at time t1 in FIG. 11A, the terminals 1 and 2 start clocking a back-off time, and the terminals 3, 4, and 5 start clocking the gap time. Since the back-of time of the terminal 1 first elapses, the terminal 1 initiates transmission of data. At a point in time when the back-off time of the terminal 2 has elapsed and when the gap times of the terminals 3 to 5 have elapsed, the transmission channel is already out of an idle state; hence, the terminal 2 does not transmit data, and the terminals 3 to 5 do not perform clocking of back-off times. In the drawings and drawings for describing subsequent timings, a clocking block and a data transmission block, which are surrounded by broken lines, show operation which is not actually performed. The idle state is a state where no data flow in the transmission channel.

The terminals 2 through 5, which hold transmitting data at time t2 that is achieved after elapse of the IFS since the terminal 1 completes transmission of data, start clocking a back-off time or a gap time as with the time t1. The back-off time of the terminal 2 first elapses at this time, the second terminal starts transmitting data. Since the transmission channel is already out of an idle state at a point in time when the gap times of the terminals 3 through 5 have elapsed, the terminals 3 through 5 do not clock back-off times.

The terminals 3 through 5, which hold transmitting data at time t3 that is achieved after elapse of the IFS since the terminal 2 completed transmission of data, start clocking a gap time and subsequently clocking a back-off time as with the time t1. The gap time and back-off time of the terminal 3 first elapse at this time, the third terminal starts transmitting data. Since the transmission channel is already out of an idle state at a point in time when the gap times and back-off times of the terminals 4 and 5 have elapsed, the terminals 4 and 5 do not transmit data.

The terminals 4 and 5, which hold transmitting data at time t4 that is achieved after elapse of the IFS since the terminal 3 completed transmission of data, start clocking a gap time and subsequently clocking a back-off time as with the time t1. The gap time and back-off time of the terminal 4 first elapse at this time, the terminal 4 starts transmitting data. Since the transmission channel is already out of an idle state at a point in time when the gap time and back-off time of the terminal 5 elapsed, the terminal 5 does not transmit data.

As mentioned above, the duration of the gap time is changed according to a priority level of transmitting data, whereby high-priority data are first transmitted when a plurality of terminals are about to transmit data.

In another example shown in FIG. 11B, the terminals 4 and 5 are about to transmit "low priority" data. When an idle state of the transmission channel is detected at time t1 in FIG. 11B, the terminals 4 and 5 start clocking gap times and subsequently clocking back-off times. Since both kinds of data that the terminals 4 and 5 are about to transmit have low priority levels, a gap time of the same duration is clocked, and a back-off time is subsequently clocked. Since the back-off time of the terminal 4 first elapses, the terminal 4 starts transmitting data. Since the transmission channel is already out of an idle state at a point in time when the gap time and the back-off time of the terminal 5 have elapsed, the terminal 5 does not transmit data.

The terminals 4 and 5, which hold transmitting data at time t12 that is achieved after elapse of the IFS since the terminal 4 completed transmission of data, start clocking a gap time and subsequently clocking a back-off time as with the time t11. The gap time and back-off time of the terminal 5 first elapse at this time, the terminal 5 starts transmitting data. Since the transmission channel is already out of an idle state at a point in time when the gap time and back-off time of the terminal 5 elapsed, the terminal 4 does not transmit data.

The terminal 4, which holds transmitting data at time t13 that is achieved after elapse of the IFS since the terminal 5 completed transmission of data, start clocking a gap time and subsequently clocking a back-off time as with the time t11. The terminal 4 starts transmitting data at a point in time when the gap time and back-off time of the terminal 4 have elapsed.

Thus, when contention arises at the time of transmission of data having the same priority level, any of the terminals transmit data in accordance with a random value of the back-off time.

As mentioned above, a gap time that is a fixed wait time is inserted between frames separately from a back-off time, the duration of the gap time is changed according to transmitting data, whereby high priority data are transmitted by priority in an environment (see FIG. 11A) where data having different priority levels are mixedly present. However, in an example where only data having low priority levels are present (see; for instance, FIG. 11B), a gap time is inserted before transmission of all kinds of data, the gap time becomes a waste time, which in turn deteriorates transmission efficiency.

Moreover, even when an attempt is made to transmit data having a high priority level in a prioritized manner by insertion of a gap time, a case where a requested delay time (a limit value of delay conditions) is not fulfilled arises depending on the data length (frame length) of transmitting data. Influence of a frame length will be described by reference to FIG. 12.

In the example shown in FIG. 12, the terminals 1 and 2 are about to transmit "high priority" data, and the terminal 5 is about to transmit "low priority" data. When an idle state of the transmission channel is detected at time t1 in FIG. 12, the terminal 5 holding transmitting data starts clocking a gap time and a back-off time and starts transmitting data at time t2 that is a point in time when the back-off time elapses.

Subsequently, even when transmitting data to the terminal 2 arises at time t3 and when transmitting data to the terminal 1 arises at time t4, the transmission channel is in the middle of transmitting data from the terminal 5, and hence clocking of the back-off time by the terminals 1 and 2 is not started. Transmission of data from the terminal 5 ends at time t5; the terminals 1 and 2 holding transmitting data start clocking back-off times at time t6 achieved after elapse of the IFS; and the terminal 5 starts clocking a gap time. Since the back-off time of the terminal 1 first elapses, the terminal 1 starts transmitting data. At a point in time when the back-off time of the terminal 2 has elapsed and when the gap time of the terminal 5 has elapsed, the transmission channel is already out of an idle state; hence, the terminal 2 does not transmit data, and the terminal 5 does not clock the back-off time.

Transmission of data from the terminal 1 ends at time t7, and the terminal 2 holding transmitting data starts clocking a back-off time at time t8 achieved after elapse of the IFS, and the terminal 5 starts clocking a gap time. Here, since the back-off time of the terminal 2 first elapses, the terminal 2 starts transmitting data. Since the transmission channel is already out of an idle state at a point in time when the gap time of the terminal 5 has elapsed, the terminal 5 does not clock a back-off time.

As mentioned above, even in the middle of transmission of data having a low priority level, transmission of high-priority data is commenced after the transmission of data having the low priority level. However, there may arise a case where a requested delay time of high priority data is not fulfilled if no limitations are imposed on the duration of transmitting data. In an example shown in FIG. 12, since the length (designated by a double-headed arrow of a solid line) of data from the terminal 5 is long, transmission of data from the terminal 1 and transmission of data from the terminal 2 do not satisfy a requested delay time of high priority data (designated by a double-headed arrow of a dashed line). Specifically, the data delay time of the terminal 1 (a time from time t4 when transmitting data arises until time t7 when transmission of data ends is designated by a broken line) and the data delay time of the terminal 2 (a time from time t3 when transmitting data arises until time t9 when transmission of data ends is designated by a broken line) becomes longer than the requested delay time.

Collision between data having the same priority level cannot be avoided in terms of a probability. When collision arises, a data delay time increases Hence, it is necessary to prevent the data delay time from exceeding a requested delay time even when collision arises by increasing the number of transmission operations performed within the requested delay time.

SUMMARY

The following mentioned embodiment has been conceived in the circumstance and aims a providing a communication apparatus, a communication method, and an integrated circuit that enable efficient transmission while fulfilling limitations on a delay appropriate to transmitting data.

A communication apparatus according to the following mentioned embodiment is a communication apparatus for connecting to a transmission channel capable of transmitting a plurality of kinds of data, each kind of data having different priority levels, the apparatus including: an acquisition section which acquires each priority information of each kind of data on the transmission channel; and a transmission controller that, when transmitting data having a predetermined priority are transmitted from the communication apparatus, controls a time from a predetermined transmission reference time to a transmission end time of the transmitting data in accordance with the priority information.

According to the first communication apparatus, a priority level of data transmitted through a transmission channel is acquired, and a time from a transmission reference time until a transmission end time of transmitting data is controlled in accordance with priority information corresponding to the priority level; hence, data transmission with superior transmission efficiency can be performed while delay conditions for transmitting data are fulfilled. A word "data in the middle of transmission" used herein includes data transmitted through a transmission channel during a predetermined period as well as data that are in the middle of transmitting through the transmission channel at a certain point in time. The predetermined period is determined, as appropriate, by means of timing at which priority information is acquired, and the like.

A communication method according to the following mentioned embodiment is a communication method for connecting to a transmission channel capable of transmitting a plurality of kinds of data, each kind of data having different priority levels, the method including the steps of: acquiring each priority information of each kind of data on the transmission channel; and controlling a time from a predetermined transmission reference time until a transmission end time of a transmitting data in accordance with the priority information when the transmitting data having a predetermined priority are transmitted.

According to the first communication method, a priority level of data transmitted through a transmission channel is acquired, and a time from a transmission reference time until a transmission end time of transmitting data is controlled in accordance with priority information corresponding to the priority level; hence, data transmission with superior transmission efficiency can be performed while delay conditions for transmitting data are fulfilled. A word "data in the middle of transmission" used herein includes data transmitted through a transmission channel during a predetermined period as well as data that are in the middle of transmitting through the transmission channel at a certain point in time. The predetermined period is determined, as appropriate, by means of timing at which priority information is acquired, and the like.

An integrated circuit according to the following mentioned embodiment is an integrated circuit used in a communication apparatus for connecting to a transmission channel capable of transmitting a plurality of kinds of data, each kind of data having different priority levels, the circuit including: an acquisition section which acquires each priority information of each kind of data on the transmission channel; and a transmission controller that, when transmitting data having a predetermined priority are transmitted from the communication apparatus, controls a time from a predetermined transmission reference time to a transmission end time of the transmitting data in accordance with the priority information.

According to the integrated circuit of the present invention, a priority level of data transmitted through a transmission channel is acquired, and a time from a transmission reference time until a transmission end time of transmitting data is controlled in accordance with priority information corresponding to the priority level; hence, data transmission with superior transmission efficiency can be performed while delay conditions for transmitting data are fulfilled. A word "data in the middle of transmission" used herein includes data transmitted through a transmission channel during a predetermined period as well as data that are in the middle of transmitting through the transmission channel at a certain point in time. The predetermined period is determined, as appropriate, by means of timing at which priority information is acquired, and the like.

As is apparent from the description provided above, the following mentioned embodiment enables provision of a communication apparatus, a communication method, and an integrated circuit that enable efficient transmission of data while fulfilling delay conditions conforming to the transmitting data.

BRIEF DESCRIPTION OF THE DRAWINGS

FIGS. 7A to 7C are views each showing a specific example of frame priority level information acquired in the power line communication system;

FIGS. 8A to 8C are views each showing example transmission timing based on control of a gap time in the power line communication system;

FIGS. 9A and 9B are views each showing example transmission timing based on control of a data length of communication data performed in the power line communication system;

DETAILED DESCRIPTION

An embodiment of the present invention will be described hereunder by reference to the drawings. A power line communication apparatus and a power line communication system are taken as examples in the following description, but another communication apparatus and another communication system using a scheme such as a wireless LAN, may also be adopted.

Figure 1:
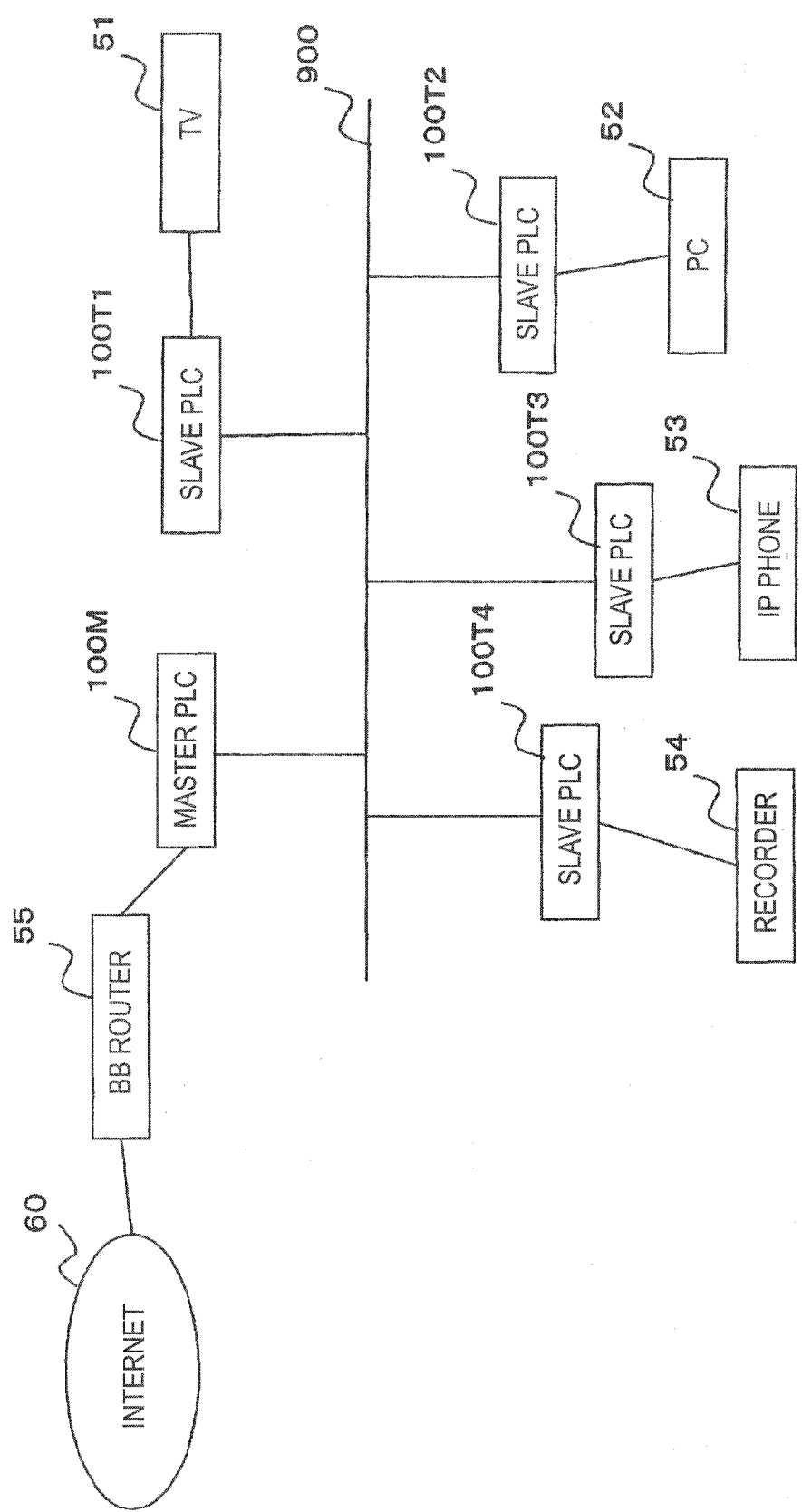
FIG. 1 is a view showing an example general configuration of a power line communication system.

A power line communication system shown in FIG. 1 has a plurality of PLC (Power Line Communication) modems 100M, 100T1, 100T2, 100T3, and 100T4 connected to a power line 900. FIG. 1 shows five PLC modems, but the number of modems to be connected is arbitrary. The PLC modem 100M serves as a master unit and manages connection statuses (link statuses) of the other PLC modems 100T1, ..., 100T4 serving as slave units. However, the PLC modem serving as a master unit is not indispensable.

In the following descriptions, when mention is made of the master unit and a specific slave unit, the units are described as the PLC modems 100M, 100T1, 100T2, 100T3, and 100T4. When mention is generally made of a slave unit, the slave unit is described as the PLC modem 100T. Further, when mention is made of a PLC modem which is not confined to a master unit or a slave unit, the modem is described simply as a PLC modem 100.

Although the power line 900 is depicted by one line in FIG. 1, the power line actually consists of two or more lead wires, and the PLC modem 100 is connected to two of the lead wires.

As described in detail later, the PLC modem 100 has a LAN (Local Area Network) modular jack, such as RJ45, and the modular jack is connected to a television (TV) set 51, a personal computer (PC) 52, an IP phone 53, a recorder 54, and a broadband router 55. The broadband router 55 is connected to the Internet. The power line communication system is an example communication system that implements the communication method of the embodiment and may also be another communication system, such as wireless LAN.

Figure 2A:
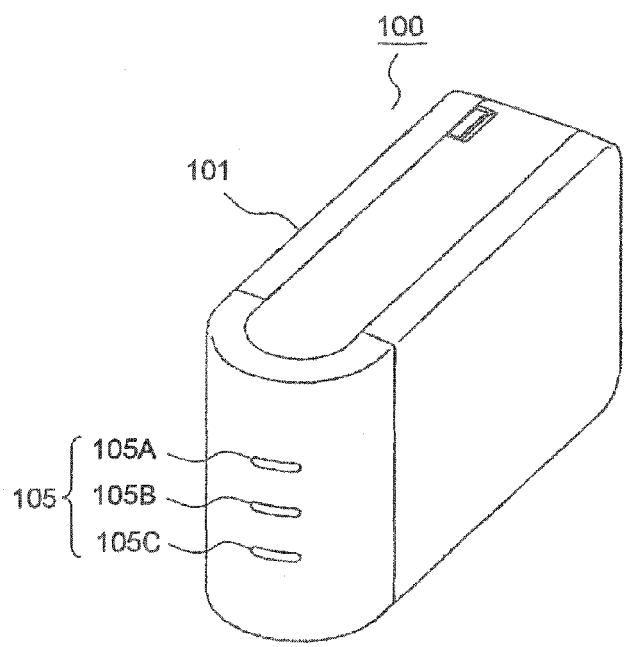
FIGS. 2A to 2C are views showing appearances of a PLC modem.
Figure 2B:
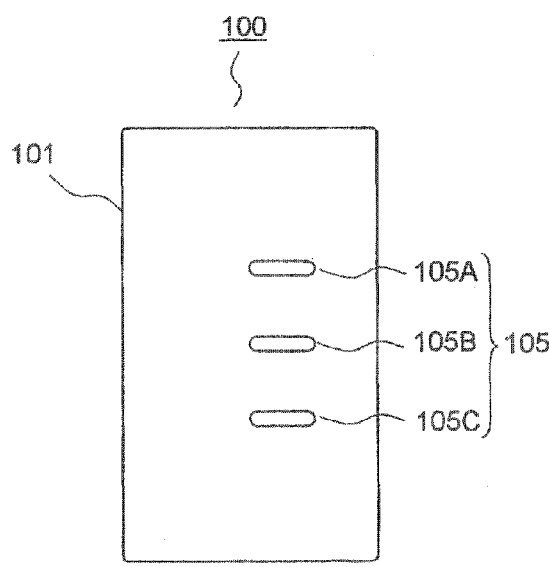
Figure 2C:
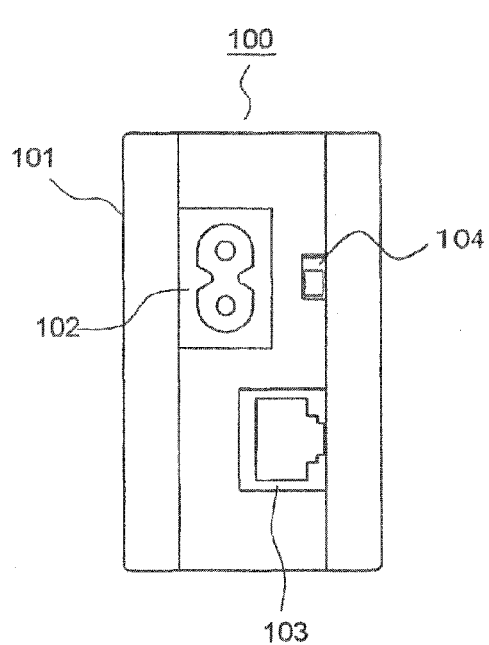

The PLC modem 100 shown in FIGS. 2A to 2C has a housing 101, and an indicator 105 consisting of LEDs (Light-Emitting Diodes) 105A, 105B, and 105C as shown in FIGS. 2A and 2B is provided on the front of the housing 101. A power supply connector 102, a LAN (Local Area Network) modular jack 103, such as RJ45, and a changeover switch 104 for switching an operation mode, and the like, are provided on the back of the housing 101, as shown in FIG. 2C. A power supply cable (not shown in FIGS. 2A to 2C) is connected to the power supply connector 102, and a LAN cable (not shown in FIGS. 2A to 2C) is connected to the modular jack 103. The PLC modem 100 may also be additionally provided with a Dsub (D-subminiature) connector, and a Dsub cable may also be connected to the connector.

Figure 3:
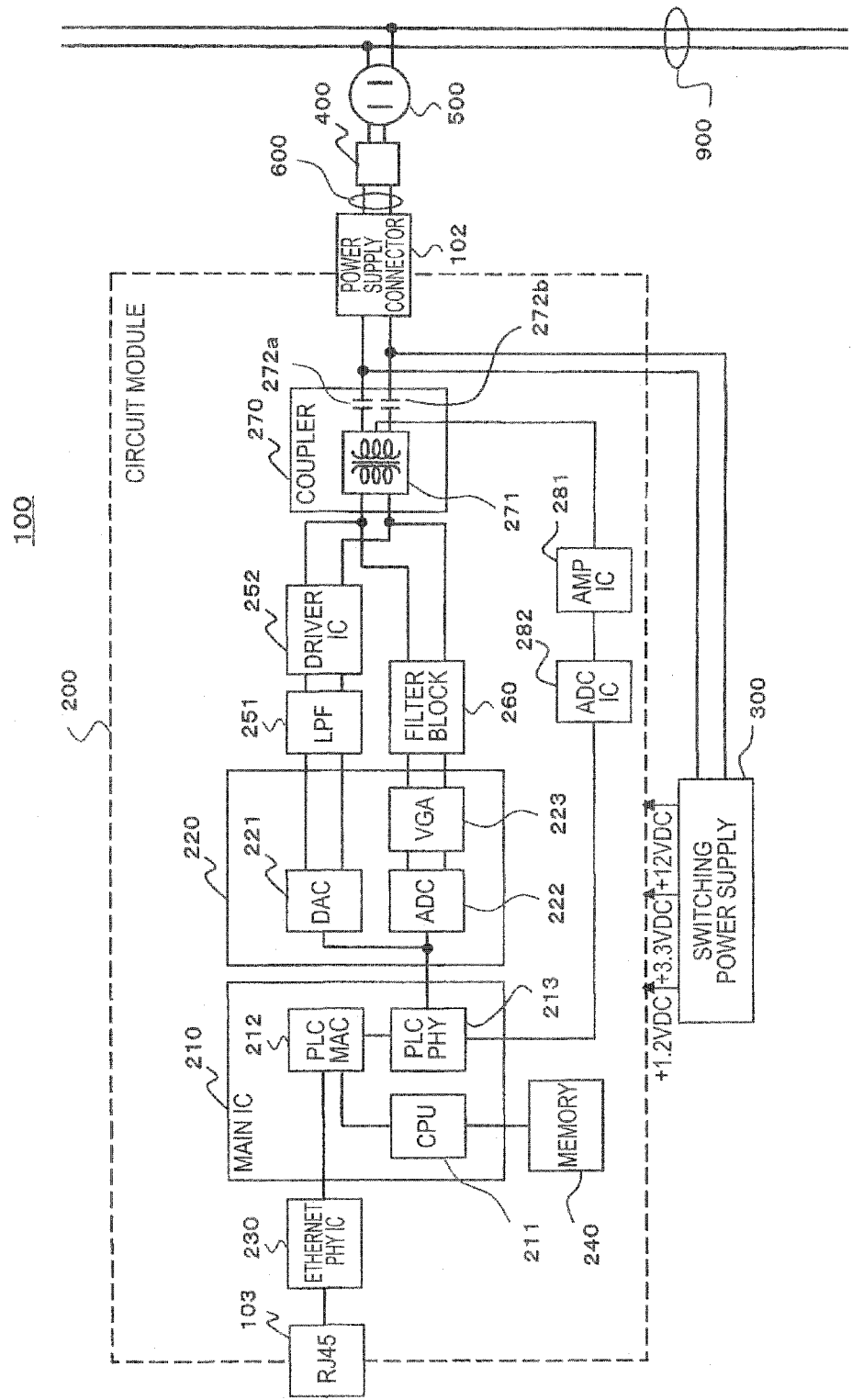
FIG. 3 is a block diagram showing an example hardware of the PLC modem.

As shown in FIG. 3, the PLC modem 100 has a circuit module 200 and a switching power supply 300. The switching power supply 300 is for supplying the circuit module 200 with various voltages (e.g., +1.2V, +3.3V, and +12V) and includes; for instance, a switching transformer and a DC-DC converter (both of which are not illustrated).

The circuit module 200 is provided with a main IC (Integrated Circuit) 210, an AFE IC (Analog Front END Integrated Circuit) 220, an Ethernet PHY IC (Physic layer Integrated Circuit) 230, memory 240, a low-pass filter (LPF) 251, a driver IC 252, a bandpass filter (BPF) 260, and a coupler 270. The switching power supply 300 and the coupler 270 are connected to the power connector 102 and further to the power line 900 by way of a power cable 600, a power plug 400, and an electric outlet 500. The main IC 210 functions are a control circuit that performs power line communication.

The main IC 210 consists of a CPU (Central Processing Unit) 211, a PLC MAC (Power Line Communication Media Access Control layer) block 212, and a PLC PHY (Power Line Communication Physical layer) block 213. The CPU 211 is equipped with a 32-bit RISC (Reduced Instruction Set Computer) processor. The PLC MAC block 212 manages a MAC (Media Access Control) layer of a PLC transmit/receive signal, as well as managing a MAC layer for controlling Ethernet communication. The PLC PHY block 213 manages a PHY (Physical layer) of a transmit/receive signal. The AFE IC 220 consists of a DA converter (DAC: D-A converter) 221, an AD converter (ADC: A-D converter) 222, and a variable amplifier (VGA: Variable Gain Amplifier) 223. The coupler 270 consists of a coil transformer 271 and coupling capacitors 272a and 272b. The CPU 211 controls operation of the PLC MAC block 212 and operation of the PLC PHY block 213 by utilization of data stored in the memory 211, as well as controlling the entirety of the PLC modem 100.

Communication established by the PLC modem 100 is generally performed as follows. Data input from the modular jack 103 are sent to the main IC 210 by way of the Ethernet PHY IC 230 and subjected to digital signal processing, whereby a digital transmission signal is generated. The thus-generated digital transmission signal is converted into an analogue signal by means of the DA converter (DAC) 221 of the AFE IC 220 and output to the power line 900 by way of the low-pass filter 251, the driver IC 252, the coupler 270, the power connector 102, the power cable 600, the power plug 400, and the power outlet 500.

The signal received from the power line 900 is transmitted to the bandpass filter 260 by way of the coupler 270 and converted into a digital signal by means of the AD converter (ADC) 222 after a gain of the signal has been adjusted by the variable power amplifier (VGA) 223 of the AFE IC 220. The thus-converted digital signal is sent to the main IC 210 and subjected to digital signal processing, to thus be converted into digital data. The thus-converted digital data are output from the modular jack 103 by way of the Ethernet PHY IC 230.

Example digital signal processing realized by the main IC 210 will now be described. The PLC modem 100 is for performing multicarrier communication using a plurality of subcarriers of an OFDM (Orthogonal Frequency Division Multiplexing) scheme, and the like. Transmitting data are converted into an OFDM transmission signal, and digital processing for converting an OFDM received signal into received data is principally performed by the PLC PHY block 213.

Figure 4:
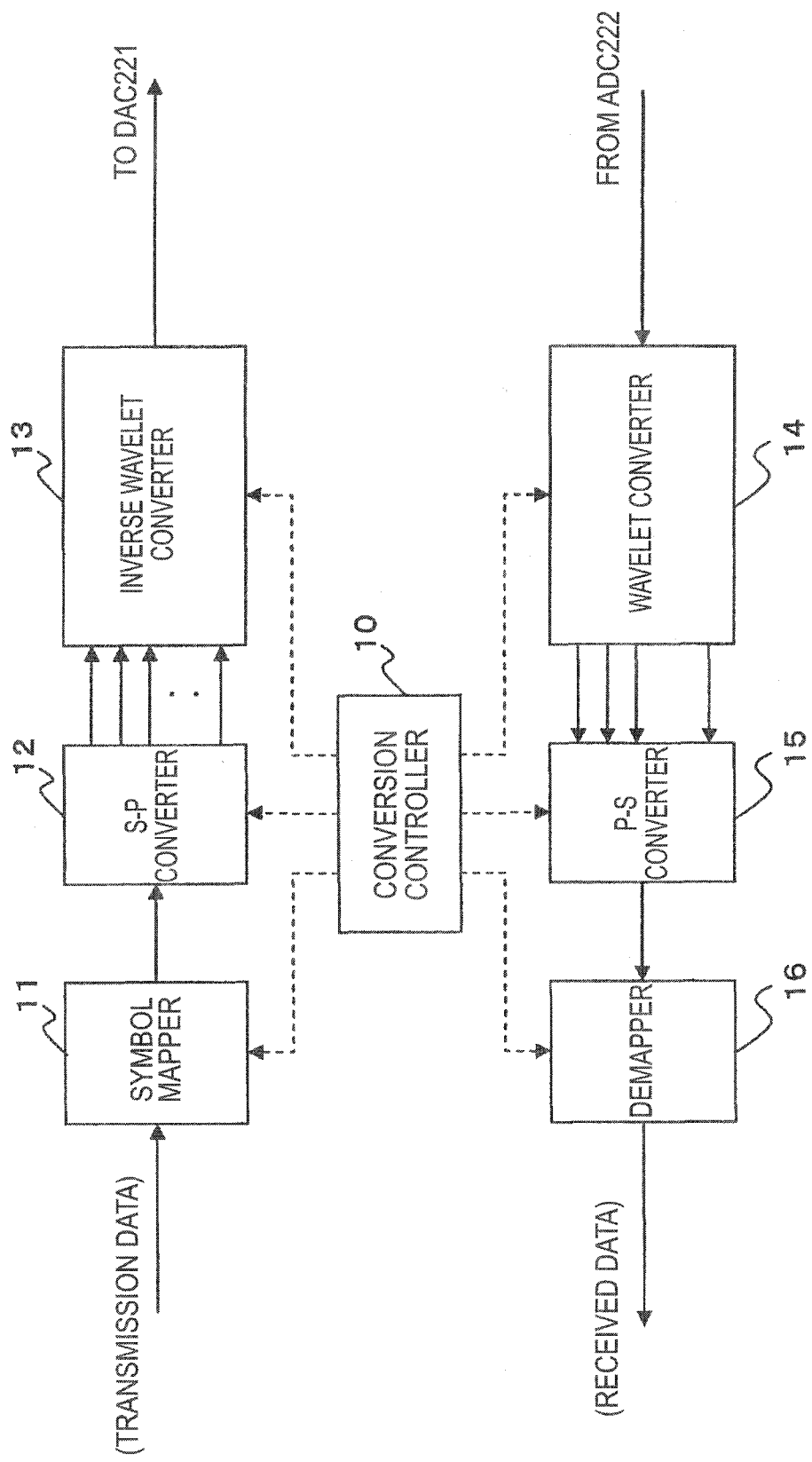
FIG. 4 is a view for explaining an example digital signal processing performed in the PLC modem.

The PLC PHY block 213 performs digital signal processing for effecting OFDM transmission utilizing wavelet transformation. As shown in FIG. 4, the PLC PHY block 213 has functions equivalent of a conversion controller 10, a symbol mapper 11, a serial-parallel converter (an S-P converter) 12, an inverse wavelet converter 13, a wavelet converter 14, a parallel-serial converter (a P-S converter) 15, and a demapper 16.

The symbol mapper 11 converts bit transmitting data into symbol data and perform symbol mapping (e.g., PAM modulation) in accordance with the symbol data. The S-P converter 12 converts mapped serial data into parallel data. The inverse wavelet converter 16 subjects the parallel data to inverse wavelet conversion, to thus generate data pertaining to a time axis and a sampled value sequence representing a transmission symbol. The data are sent to the DA converter (DAC) 221 of the AFE IC 220.

The wavelet converter 14 converts received digital data (a sampled value sequence sampled at the same sampling rate as that used for transmission) received from the AD converter (ADC) 222 of the AFE IC 220 into data pertaining to a frequency axis through discrete wavelet conversion. The P-S converter 15 converts the parallel data pertaining to the frequency axis into serial data. The demapper 16 computes amplitude values of the respective sub-carriers and determines a received signal, thereby determining received data.

Even in the power line communication system shown in FIG. 1, transmission timing for a case where data transmission is performed is basically timing for a CSMA (Carrier Sense Multiple Access) scheme. Specifically, each of the communication apparatuses monitors the usage condition of the transmission channel and performs transmission when another communication apparatus is not using the transmission channel (i.e., when the transmission channel is in idle). When it is detected that another communication apparatus is not using the transmission channel, transmission is started after elapse of a random wait time (a back-off) time. The power line communication system differs from a related-art power line communication system in that transmission channel priority level information showing a priority level of data that are in the middle of transmitting through the transmission channel is acquired and that a wait time or the length of transmitting data is controlled on the basis of the acquired transmission channel priority level information and the priority level information of the transmitting data. The word "idle state" means a state where no data are present in the transmission channel and where data communication is possible; specifically, where carrier sensing is not carried out.

When a wait time is controlled, the wait time is determined by including a random wait time (a back-off time) randomly determined at each transmission timing and a fixed wait time (a gap time) set to a given value in accordance with transmission channel priority level information and priority level information of transmitting data, and the fixed wait time is changed in accordance with the transmission channel priority level information and the priority level information of the transmitting data. For instance, when a priority level indicated by the transmission channel priority level information is not higher than the priority level of the transmitting data, a fixed wait time for the transmitting data is altered to zero.

When the length of transmitting data is controlled and when the priority level indicated by the transmission channel priority level information shows a high priority level, the length of transmitting data is set to a length based on delay information requested by the data having the high priority level. Specifically, the length is set to a data length which enables performance of transmission satisfying a delay request after completion of communication even when data having a lower priority level is in the middle of transmitting at the time of an attempt being made to transmit the data having the high priority level.

Figure 5:
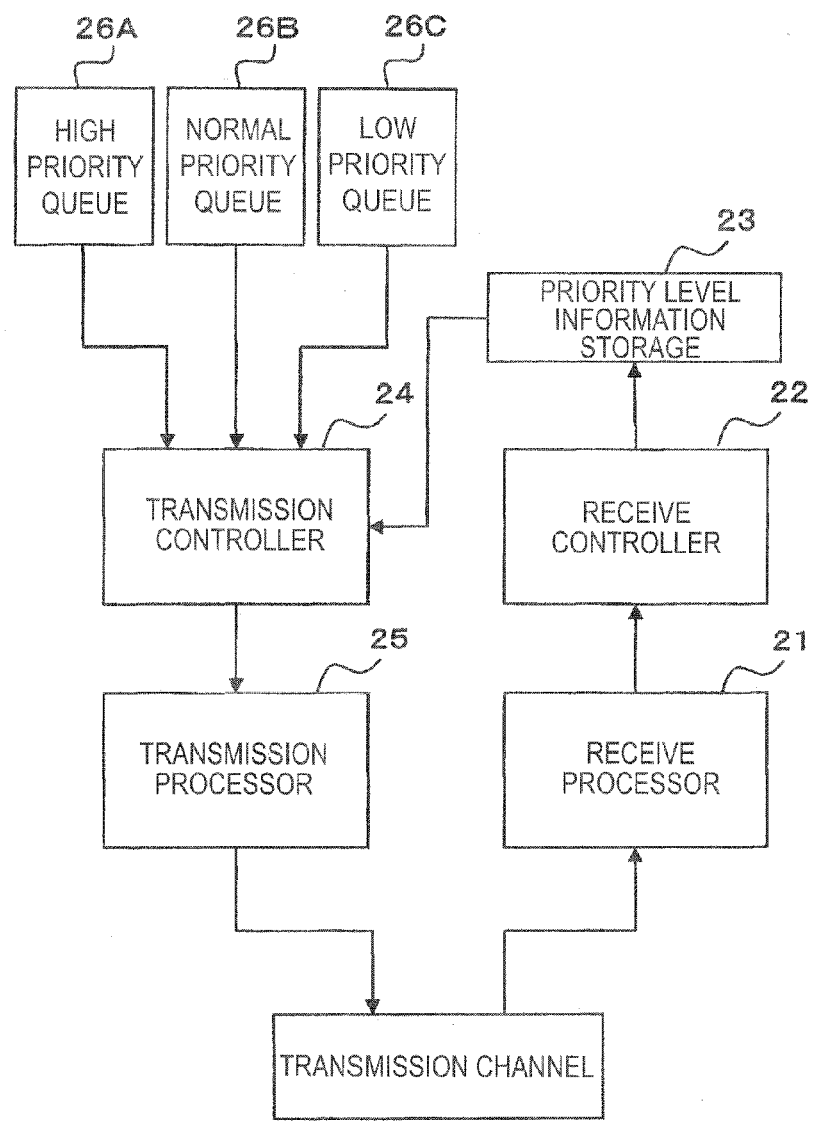
FIG. 5 is a functional block diagram for describing control a transmission timing of the PLC modem or the length of transmitting data.

FIG. 5 is a functional block diagram for describing control of a transmission timing or the length of transmitting data on the basis of the transmission channel priority level information showing a priority level of data that are in the middle of transmitting through the transmission channel. The PLC modem 100 has a receive processor 21, a receive controller 22, a priority level information storage 23, a transmission controller 24, a transmission processor 25. The PLC modem 100 also has a high priority queue 26A, a normal priority queue 26B, and a low priority queue 26C which store transmitting data in accordance with a priority level.

The receive processor 21 processes a receive signal from the transmission channel, thereby generating receive data, and corresponds to the driver IC 252, the LPF 251, the AFEIC 220, the PLC PHY block 213, and the like, of the main IC shown in FIG. 3. The receive controller 22 generates, from received data, transmission channel priority level information showing a priority level of data that are in the middle of transmitting through a transmission channel and corresponds to the PLC MAC block 212, the CPU 211, the memory 240, and the like, of the main IC shown in FIG. 3. Generation of the transmission channel priority level information will be described later. The priority level information storage 23 stores transmission channel priority level information generated by the receive controller 22 and corresponds to an unillustrated storage device or the memory 240 in the PLC PHY block 213 of the main IC.

The transmission controller 24 controls transmission of data stored in the high priority queue 26A, the normal priority queue 26B, and the low priority queue 26C and corresponds to the PLC MAC block 212 of the main IC, the CPU 211, the memory 240, and the like, shown in FIG. 3. Specifically, at least one of the priority level information acquired from the priority level information storage 23 or a gap time and a data length (the length of a transmission frame) for transmitting data stored in each queue is controlled, and transmission timing is further controlled by means of back-off operation. Details of transmission control will be described later. The transmission processor 25 generates a transmission signal from transmitting data supplied from the transmission controller 24 and corresponds to the PLC PHY block 213, the AFEIC 220, the filter block 260, and the like of the main IC shown in FIG. 3. The high priority queue 26A, the normal priority queue 26B, and the low priority queue 26C may also be divided into a plurality of queues in respective terminals and managed on a per-terminal basis. Queues having the same priority level are assumed to be subjected to transmission control by use of the same parameters.

Figure 6:
FIG. 6 is a view showing an example configuration of a data frame employed in the power line communication system.
Figure 10:
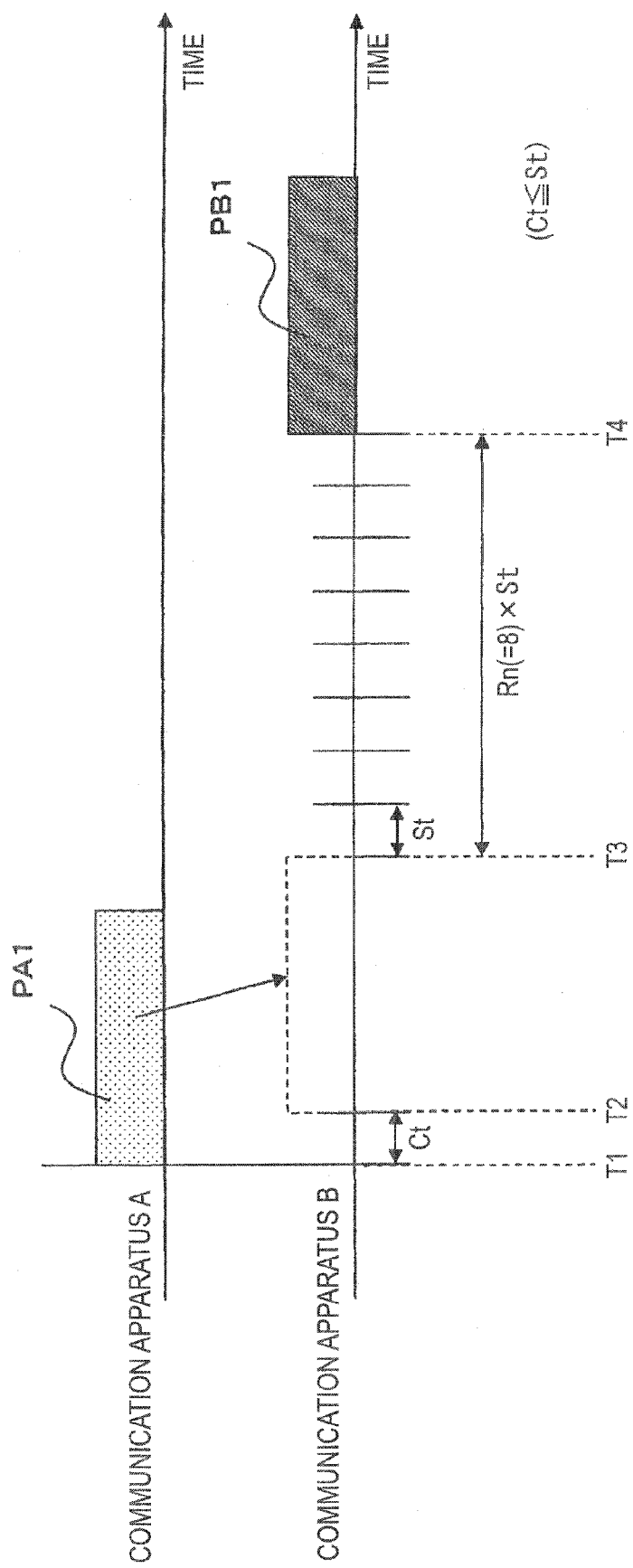
FIG. 10 is a view showing example timing achieved when data are transmitted by means of a CSMA scheme.
Figure 11:
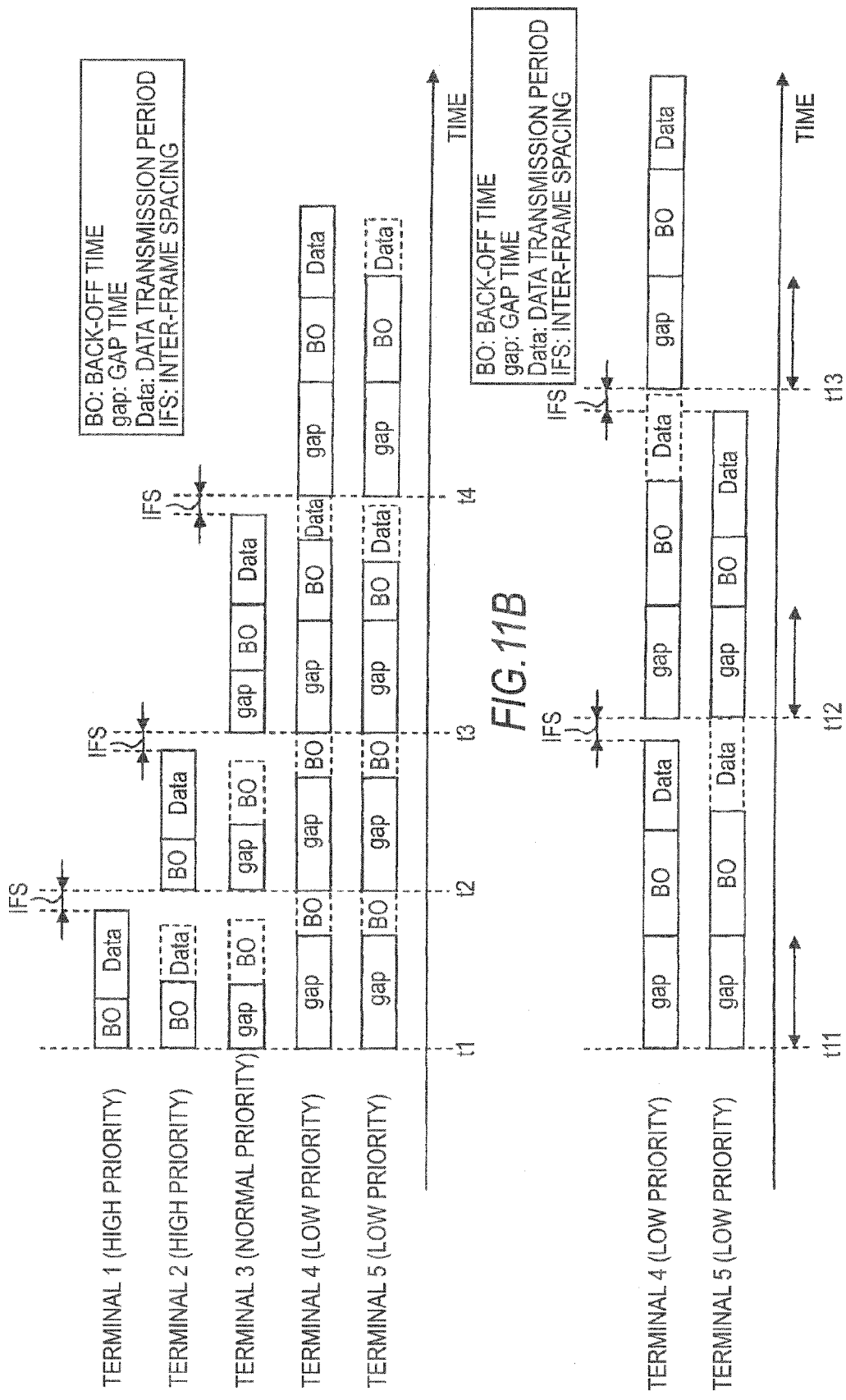
FIGS. 11A and 11B are views each showing example timing achieved when transmission is performed while a gap time whose length varies according to a priority level of data is added to data.

Generation of transmission channel priority level information performed by the receive controller 22 will now be described. Transmission channel priority level information is generated by analysis of a header of a data frame that is present in the transmission channel; specifically, the information is generated by means of determining frame priority level information contained in the header of the transmitting data frame through the transmission channel within a predetermined period. FIG. 6 shows an example configuration of a data frame. Since a header of the data frame can be demodulated by all terminals (the PLC modems 100), each of the terminals can perform individual generation processing. For instance, eight data frames are received for a predetermined period, and transmission channel priority level information is generated from the frame priority level information contained in the header.

FIGS. 7A to 7C show specific examples of the thus-acquired transmission channel priority level information. The frame priority level information is assumed to have eight levels (from level 0 to level 7, and the level 7 is a high priority level). Frame priority level information to be acquired is labeled as assigned when data frames with respective priority levels are received and labeled as none when the data frames are not received. FIG. 7A shows transmission channel priority level information acquired when data frames with priority levels 7, 6, and 3 are received and when data frames with the other priority levels are not received. FIG. 7B shows transmission channel priority level information acquired when data frames with priority levels 6 and 3 are received and when data frames with the other priority levels are not received. FIG. 7C shows transmission channel priority level information acquired when only the data frame with a priority level 3 is received and when data frames with the other priority levels are not received. Although omitted from the drawings, a control frame, such as a response frame responsive to a data frame and a beacon, may also be transmitted while a high priority level value of priority level information of data belonging to a terminal that transmits the frame or all priority level values are described in the control frame, and the information may also be acquired and reflected as with the data frame.

The priority level is determined in accordance with the type of data. For instance, from the viewpoint of assurance of QoS, audio data, such as VoIP data, and video data, such as streaming data, are set to a higher priority level (priority levels 7, 6 in the case of the above embodiment). Priority levels may also be fixedly set in advance in each of the PLC modems 100.

Not all of the PLC modems must carry out generation of transmission channel priority level information to be performed by the receive controller 22 For instance, only the master PLC modem 100M in the power line communication system shown in FIG. 1 may also perform generation of transmission channel priority level information. In that case, the master PLC 100M transmits the transmission channel priority level information to the slave PLC modems 100T by means of a beacon, and the like. The slave PLC modems 100T store the thus-received transmission channel priority level information into the priority level information storage 23.

When the respective PLC modems 100 carry out generation of transmission channel priority level information performed by the receive controller 22, generation may also be performed at individual timings or in a synchronous manner in accordance with a system time, and the like.

FIGS. 8A to 8C show example transmission timings conforming to gap time control performed in the power line communication system of the embodiment of the present invention. FIG. 8A shows a case where transmission channel priority level information data shown in FIG. 7A is acquired; namely, where a priority level 7 is labeled as a "high priority level," a priority level 6 is labeled as a "normal priority level," and a priority level 3 is labeled as a "low priority level." FIG. 8A shows timings acquired when the transmission channel priority level information includes a "high priority level" and when data having a plurality of priority levels are mixedly present. In the embodiment shown in FIG. 8A, a terminal 1 and a terminal 2 are about to transmit "high priority" data; a terminal 3 is about to transmit "normal priority" data; and a terminal 4 and a terminal 5 are about to transmit "low priority" data. When it is detected, at time t1 shown in FIG. 8A, that the transmission channel is in idle, the terminals 1 and 2 start clocking back-off times, and the terminals 3, 4, and 5 start clocking gap times. Since the back-off time of the terminal 1 first elapses, the terminal 1 starts transmission of data. At a point in time when the back-off time of the terminal 2 elapses and points in time when the gap times of the terminals 3 to 5 elapse, the transmission channel is already out of an idle state.

Hence, the terminal 2 does not transmit data, and the terminals 3 to 5 do not clock back-off times. An IFS (Inter Frame Spacing) is defined as the minimum time in consideration of an internal processing time of a terminal, and the like, and the same also applies to any counterparts in the following descriptions. Further, the IFS can also be defined as zero. In the following descriptions, there may also be a case where the terminal is used in the sense of the PLC modem 100.

FIG. 8B shows timings achieved in a case where the priority level information data shown in FIG. 7B are acquired; where the priority level 6 is labeled as a "normal priority level" and the priority level 3 is labeled as a "low priority level"; and where the terminal 3 is about to transmit "normal priority" data and the terminal 5 is about to transmit "low priority" data. In this case, the "high priority" data are not present in the transmission channel, and the transmission channel priority level is "normal priority level" and is not higher than the priority level of the data that the terminal 3 is about to transmit. Hence, a gap time for transmitting data of the terminal 3 is set to zero.

When it is detected, at time t21 shown in FIG. 8B, that the transmission channel is in idle, the terminal 3 starts clocking a back-off time, and the terminal 5 starts clocking a gap time and subsequently clocking a back-off time. Since the back-off time of the terminal 3 first elapses, the terminal 3 starts transmitting data. At points in time when the gap time and back-off time of the terminal 5 elapse, the transmission channel is already out of an idle state. Hence, the terminal 5 does not transmit data.

There is a case where a time (e.g., time t1, t2, . . . , or t34 in FIGS. 8A to 8C) at which clocking of the back-off time or the gap time is started is defined as a transmission reference time. Further, there is also a case where a time when transmission of transmitting data is completed is defined as a transmission end time.

The terminal 3 holding transmitting data, as at time t21, at time t22 achieved after elapse of the IFS since the terminal 3 completed data transmission starts clocking of a back-off time, and the terminal 5 starts clocking a gap time and subsequently clocking a back-off time. Even in this case, the back-off time of the terminal 3 first elapses, and hence the terminal 5 starts transmitting data. At points in time when the gap time and the back-off time of the terminal 5 elapse, the transmission channel is already out of an idle state, and hence the terminal 5 does not transmit data.

At time t23 achieved after elapse of the IFS since the terminal 3 completed data transmission, only the terminal 5 holding transmitting data performs clocking of a wait time for data transmission; namely, starts clocking a gap time and subsequently clocking a back-off time. At a point in time when the gap time and back-off time of the terminal 5 elapsed, data are transmitted.

As mentioned above, at the time of transmission of data from the terminal 3, transmission timing is controlled while the gap time is taken as zero. Hence, a useless gap time is not inserted, and deterioration of transmission efficiency is avoided. Moreover, the gap time of the terminal 5 that transmits "low priority" data is also shortened, whereby transmission efficiency can be enhanced further.

FIG. 8C shows a case where priority level information data shown in FIG. 7C are acquired and where the priority level 3 is labeled as a "low priority level" and timings achieved when the terminals 4 and 5 are about to transmit "low priority" data. In this case, the "high priority" and "normal priority" data are not present in the transmission channel, and the transmission channel priority level becomes a low priority level and are not higher than the priority level of the data that the terminals 4 and 5 are about to transmit; hence, the gap time of transmitting data from the terminals 4 and 5 is also taken as zero.

When it is detected, as time t31 in FIG. 8C, that the transmission channel is in idle, the terminals 4 and 5 start clocking gap times and subsequently clocking back-off times. Since the back-off time of the terminal 4 first elapses, the terminal 4 starts transmitting data. At a point in time when the back-off time of the terminal 5 has elapsed, the transmission channel is already out of an idle state, and hence the terminal 5 does not transmit data.

At time t32 achieved after elapse of the IFS since the terminal 4 completed data transmission, the terminal 5 holding transmitting data starts clocking a back-off time as at time t31. Since transmitting data to the terminal 4 arise in the course of clocking operation of the terminal 5, the terminal 4 also starts clocking a back-off time. Since the back-off time of the terminal 5 first elapses, the terminal 5 starts data transmission. At a point in time when the back-off time of the terminal 4 has elapsed, the transmission channel is already out of an idle state, and hence the terminal 4 does not transmit data.

At time t33 achieved after elapse of the IFS since the terminal 5 completed data transmission, the terminals 4 and 5 holding transmitting data start clocking back-off times as at time t31. Since the back-off time of the terminal 4 first elapses, the terminal 4 starts data transmission. At a point in time when the back-off time of the terminal 5 has elapsed, the transmission channel is already out of an idle state, and hence the terminal 5 does not transmit data.

At time t34 achieved after elapse of the IFS since the terminal 4 completed data transmission, the terminals 4 and 5 holding transmitting data start clocking back-off times as at time t31. Since the back-off time of the terminal 5 first elapses, the terminal 5 starts data transmission. At a point in time when the back-off time of the terminal 4 has elapsed, the transmission channel is already out of an idle state, and hence the terminal 4 does not transmit data.

Even when the priority levels of all of kinds of data that the terminals attempt to transmit are low priority levels, transmission timing is controlled at the time of transmission of data transmitted from the terminals while the gap time is taken as zero. Hence, a useless gap time is not inserted, and deterioration of transmission efficiency is avoided. A contention window of a back-off time (the maximum length of the back-off time) is made smaller than a contention window shown in FIG. 8A, so that transmission efficiency can be enhanced to a much greater extent.

When the priority level of data in the transmission channel is higher than the priority level of data that the terminal attempts to transmit, control is performed such that a gap time becomes longer.

An example setting of a gap time in accordance with the transmission channel priority level information will now be described. Basically, setting is performed while a gap time for the highest priority level that is present in the transmission channel is taken as zero and while a CW (Contention Window) assigned value conforming to the priority level is taken as a reference. When transmission channel priority level information shown in FIG. 7A is acquired, gap times, for instance, are set as follows:

EXAMPLE SETTING 1

Gap for priority level 7=0
Gap for priority level 6=CW of priority level 7
Gap for priority level 3=CW of priority level 7+CW of priority level 6

Transmission sequence for respective priority levels is assured by means of such settings (this is limited to a case where data are still present after the channel is busy).

EXAMPLE SETTING 2

Gap for priority level 7=0
Gap for priority level 6=CW of priority level 7
Gap for priority level 3=CW of priority level 7 and value which is smaller than COW of priority level 6

Since there is a case where the priority level 3 is given higher priority than that given to the priority level 6 as a result of making of such settings, transmission of data having the priority level 3 becomes faster, so that a transmission rate of low priority data is enhanced.

Further, the gap time for priority level 3 may bet set as follows:

Gap for priority level 3=value smaller than sum of (CW of priority level 7 and CW of priority level 6)

When the transmission channel priority level information shown in FIG. 7B is acquired, gap times, for instance, are set as follows:

EXAMPLE SETTING 3

Gap for priority level 6=0
Gap for priority level 3=CW of priority level 6

When the transmission channel priority level information shown in FIG. 7C is acquired, gap times, for instance, are set as follows:

EXAMPLE SETTING 4

Gap for priority level 3=0

Control of a frame length based on transmission channel priority level information will now be described. FIGS. 9A and 9B show example transmission timings conforming to control of the length of communication data in the power line communication system of the present embodiment of the present invention. FIG. 9A shows timings achieved when the transmission channel priority level information includes a high priority level and where data having a plurality of priority levels are mixedly present.

In the embodiment shown in FIG. 9A, the terminals 1 and 2 are about to transmit "high priority" data, and the terminal 5 is about to transmit "low priority" data. Although unillustrated in FIG. 9A, the terminal 5 has already acquired transmission channel priority level information pertaining to the "high priority" data transmitted by the terminals 1 and 2 before time t1, and control of a length of communication data to be described later is performed by use of the transmission channel priority level information acquired before t1. When an idle state of the transmission channel is detected at t1 in FIG. 9A, the terminal 5 holding transmitting data starts clocking a gap time and a back-off time and starts transmitting data at time t2 achieved after elapse of the back-off time.

Subsequently, even when transmitting data to the terminal 2 arise at time t3 and when transmitting data to the terminal 1 arise at time t4, data from the terminal 5 are still in the middle of transmitting through the transmission channel; hence, clocking of the back-off time is not started. Transmission of the data from the terminal 5 ends at time t5; the terminals 1 and 2 holding transmitting data start clocking back-off times at time t6 achieved after elapse of the IFS; and the terminal 5 starts clocking a gap time. Since the back-off time of the terminal 1 first elapses, the terminal 1 starts transmitting data. At a point in time when the back-off time of the terminal 2 has elapsed and a point in time when the gap time of the terminal 5 has elapsed, the transmission channel is already out of an idle state. Hence, the terminal 2 does not transmit data, and the terminal 5 does not clock a back-off time.

Transmission of data from the terminal 1 ends at time t7; the terminal 2 holding transmitting data starts clocking a back-off time at time t8 achieved after elapse of the IFS; and the terminal 5 starts clocking a gap time. Since the back-off time of the terminal 2 first elapses, the terminal 2 starts transmitting data. Since the transmission channel is already out of an idle state at a point in time achieved after elapse of the gap time of the terminal 5, the terminal 5 does not clock a back-off time.

Figure 12:
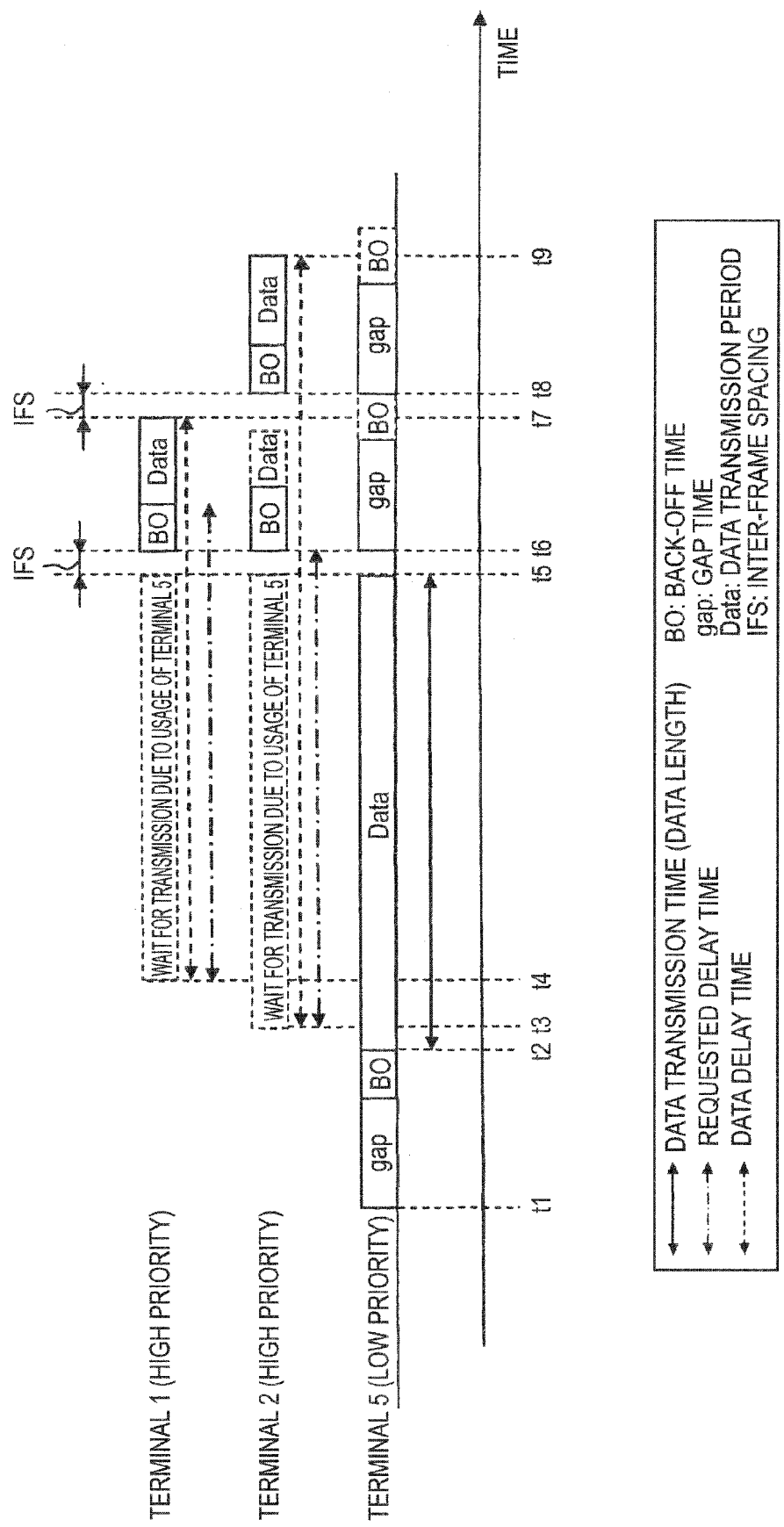
FIG. 12 is a view for describing the effect of the length of communication data on a requested delay time.

As is apparent from FIG. 9A, the length of the data from the terminal 5 (designated by a double-headed arrow of a solid line) becomes shorter than its counterpart achieved at a timing shown in FIG. 12. Consequently, a data delay time achieved at the terminal 1 (a time duration from time t4 when transmitting data arises until time t7 when transmission of data ends is denoted by a broken line) and a data delay time achieved at the terminal 2 (a time duration from time t3 when transmitting data arise until time t9 when transmission of data ends is denoted by a broken line) are shorter than a requested delay time (designated by a double-headed arrow of a one-dotted chain line).

In the embodiment shown in FIG. 9B, the terminal 5 is about to transmit "low priority" data. In this case, since data having the other priority levels are not in the transmission channel, transmitting data are transmitted at a requested data length without undergoing limitations on a data length. Consequently, overhead attributable to the gap time and the back-off time can be reduced, and deterioration of transmission efficiency can be prevented. As shown in FIG. 9B, when the priority level represented by the data in the transmission channel is lower than the priority level information of the data that the terminal is about to transmit, setting the length of transmitting data to a longer length is also preferable. Even in this case, overhead attributable to the gap time and the back-off time can be reduced, and deterioration of transmission efficiency can be reduced.

Example setting of the length of communication data in accordance with transmission channel priority level information will now be described. Basically, settings are made on the basis of a delay condition required for the highest priority level in the transmission channel The length of a low priority frame achieved at that time is preferably set to a value that fulfills a relationship of (a transmission time of a low priority frame+a gap time+CW+a transmission time of a high priority frame)<(a requested delay time for a high priority frame).

Provided that a requested delay time of the priority level 7 is 5 ms; a requested delay time of the priority level 6 is 300 ms; and a requested delay time of the priority level 3 is none, settings, for instance, are made as follows when the transmission channel priority level information shown in FIG. 7A is acquired.

EXAMPLE SETTING 1

The maximum frame length for the priority level 7=a limiting value unique to a system
The maximum frame length for the priority level 6=2 ms
The maximum frame length of the priority level 3=2 ms
When the transmission channel priority level information shown in FIG. 7B is acquired, settings are made; for instance, in a manner provided below.

EXAMPLE SETTING 2

The maximum frame length for the priority level 6=a limiting value unique to a system
The maximum frame length for the priority level 3=10 ms As in the example settings 1 and 2, the maximum frame length of the data frame not having a high priority level is changed in accordance with the high priority level of the transmission channel, thereby enabling enhancement of transmission efficiency.

When a payload section shown in FIG. 6 is a union of plurality of packets (Ethernet frames, and the like), a method for limiting a frame length can be realized by a method for making a limitation by changing the number of packets that can be transmitted within a specified time, a method for making a limitation by dividing one packet into sizes that enable transmission of the packets within the specified time, and a combination thereof.

It is desirable to simultaneously set a gap time conforming to the transmission channel priority level information and control a frame length. In this case, a synergistic effect can be expected in terms of enhancement of transmission efficiency.

The foregoing communication method may be for transmitting data after elapse of a predetermined wait time from a reference transmission time since the transmission channel changed to an idle state and controlling the predetermined wait time in accordance with the priority level information of transmitting data through the transmission channel.

According to the communication method, the predetermined wait time is controlled in accordance with the priority level information of the transmitting data through the transmission channel, and hence a time duration from the reference transmission time to the time when data are transmitted is set to an optimum value for each data transmission, thereby enabling a reduction in useless wait time. Consequently, data transmission with superior transmission efficiency can be performed while delay conditions for transmitting data are fulfilled.

Moreover, under the foregoing communication method, a communication frame that has a predetermined length and that stores the data may be generated, and the length of the communication frame may be controlled on the basis of the priority level information of the transmitting data through the transmission channel.

According to the communication method, the length of the communication frame is controlled in accordance with the priority level information of transmitting data through the transmission channel. Hence, it becomes possible to perform data transmission with superior transmission efficiency while delay conditions for transmitting data are fulfilled. In particular, the method is suitable for data transmission requiring QoS (Quality of Service) as in transmission of audio data and streaming data.

The foregoing communication method may include controlling a predetermined wait time in accordance with a priority level of transmitting data.

According to the communication method, a predetermined wait time is controlled in accordance with a priority level of transmitting data. Hence, it becomes possible to perform data transmission with superior transmission efficiency while delay conditions for transmitting data are fulfilled.

The communication method may include controlling the length of a communication frame in accordance with the priority level of transmitting data.

According to the communication method, the length of a communications frame is controlled in accordance with a priority level of transmitting data. Hence, data transmission with superior transmission efficiency becomes possible while delay conditions for transmitting data are fulfilled. In particular, the method is suitable for data transmission requiring QoS (Quality of Service) as in transmission of audio data and streaming data.

Under the communication method, a predetermined wait time may include a random wait time randomly determined at each transmission timing and a fixed wait time set to a given value in accordance with priority level information of transmitting data through a transmission channel and a priority level of transmitting data. The method may include controlling the fixed wait time in accordance with at least one of the priority level information and a predetermined priority.

According to the communication method, the fixed wait time is controlled in accordance with the priority level information about transmitting data through a transmission channel or a priority level of transmitting data. Hence, a useless wait time can be reduced by setting the fixed wait time to an optimum value for each data transmission. Consequently, data transmission with superior transmission efficiency becomes possible while delay conditions for transmitting data are fulfilled.

The communication method may include setting a fixed wait time to zero when a priority level represented by priority level information of transmitting data through a transmission channel is lower than the priority level of transmitting data.

According to the communication method, when a priority level represented by the priority level of the transmitting data through a transmission channel is lower than the priority level of transmitting data, a fixed wait time is set to zero; hence, efficient transmission of high priority data becomes possible. In particular, the method is suitable for data transmission requiring QoS (Quality of Service) as in transmission of audio data and streaming data.

The communication method may include setting a predetermined wait time achieved when transmitting data having not a high priority level are transmitted to a value that is greater than the maximum random wait time achieved when transmitting data having a high priority level are transmitted.

According to the communication method, since a predetermined wait time for transmitting data having a low priority level is set to a great value, efficient transmission of high priority data becomes possible. In particular, the method is suitable for data transmission requiring QoS (Quality of Service) as in transmission of audio data and streaming data.

The communication method may include controlling the length of a communication frame in accordance with delay information requested by data having a high priority level when a priority level represented by priority level information about transmitting data through a transmission channel is high.

According to the communication method, the length of a communication frame to be transmitted is controlled in accordance with delay information requested by data having a high priority level, and hence transmission of data having a high priority level can be early started, and delay conditions for the data can be fulfilled. In particular, the method is suitable for data transmission requiring QoS (Quality of Service) as in transmission of audio data and streaming data.

The communication method may include a method using a power line as a transmission channel.

The communication method may include acquiring priority level information about data transmitted through a transmission channel by analysis of a header of data that are present in the transmission channel.

According to the communication method, a priority level of data that are in the middle of transmitting through a transmission channel can be briefly acquired. Timing for analysis of a header of a data frame is arbitrary; however, analysis is performed periodically; for instance, at a given time interval. A header of a data frame may also be analyzed by means of all communication apparatuses connected to the transmission channel or a specific communication apparatus.

The communication method may include receiving control information transmitted from another communication apparatus connected to a transmission channel and acquiring priority level information about data transmitted through a transmission channel contained in the control information.

According to the communication method, not all of the communication apparatus need to perform data processing for acquiring a priority level of data that are in the middle of transmitting through the transmission channel, and hence processing burden on an individual communication apparatus is alleviated. The control signal is; for instance, a beacon signal. Moreover, a communication apparatus that perform data processing for acquiring a priority level of data that are in the middle of transmitting through the transmission channel is; for instance, a master unit.

The present invention is useful as a communication method, a communication system, a communication apparatus and an integrated circuit therefor that enable efficient transmission while a delay limitation appropriate to transmitting data is fulfilled.

This application is based upon and claims the benefit of priority of Japanese Patent Application No. 2007-295684 filed on Nov. 14, 2007, the contents of which are incorporated herein by reference in its entirety.

What is claimed is:

1. A communication apparatus, which implements carrier sense multiple access (CSMA), for connecting to a transmission channel capable of transmitting a plurality of types of data, including first data and second data, having different priority levels, the apparatus comprising:
   an acquisition section that acquires a priority level of the first data on the transmission channel;
   a transmission controller that controls a fixed wait time of the second data having a predetermined priority level, the fixed wait time being determined by comparing the predetermined priority level with the priority level of the first data; and
   a transmitter that transmits the second data after transmission of the first data ends, and a back off time and the fixed wait time elapse.

2. The communication apparatus according to claim 1, further comprising:
   a communication frame generator which generates a communication frame which has a predetermined length and stores the second data,
   wherein the transmission controller controls the length of the communication frame in accordance with the priority level of the first data.

3. The communication apparatus according to claim 2, wherein the transmission controller controls the length of the communication frame in accordance with the predetermined priority level of the second data.

4. The communication apparatus according to claim 2, wherein, when the priority level of the first data is a high priority level, the transmission controller controls the length of the communication frame in accordance with delay information requested for the high priority level in the transmission channel.

5. The communication apparatus according to claim 1, wherein the transmission controller controls the fixed wait time in accordance with the predetermined priority level of the second data.

6. The communication apparatus according to claim 1,
   wherein the back-off time includes a randomly determined time for each transmission and the fixed wait time includes a time determined at a constant value; and wherein the transmission controller controls the fixed wait time in accordance with at least one of the priority level of the first data and the predetermined priority level of the second data.

7. The communication apparatus according to claim 6, wherein, when the priority level of the first data is lower than the predetermined priority level of the second data, the transmission controller sets the fixed wait time to zero.

8. The communication apparatus according to claim 6, wherein the transmission controller sets the fixed wait time, used when the second data whose predetermined priority level is not a high priority level are transmitted, to a value that is greater than a maximum value of the back-off time used at the time of transmission of the first data having the highest priority level.

9. The communication apparatus according to claim 1, wherein the transmitter transmits the second data between a time from a predetermined transmission reference time to a transmission end time, the time from the predetermined transmission reference time to the transmission end time contains a time for generating a communication frame in which the second data is stored and at least one of the fixed wait time and the back-off time.

10. The communication apparatus according to claim 1, wherein the acquisition section acquires the priority level by analysis of a header of data that are present on the transmission channel.

11. The communication apparatus according to claim 1, wherein the acquisition section receives control information transmitted from another communication apparatus which is connected to the transmission channel and acquires the priority level contained in the control information.

12. A communication method, which implements carrier sense multiple access (CSMA), for connecting to a transmission channel capable of transmitting a plurality of types of data, including first data and second data, having different priority levels, the method comprising:
acquiring a priority level of the first data on the transmission channel;
controlling a fixed wait time of the second data having a predetermined priority level, the fixed wait time being determined by comparing the predetermined priority level with the priority level of the first data; and
transmitting the second data after transmission of the first data ends, and a back off time and the fixed wait time elapse.

13. The communication method according to claim 12, further comprising:
generating a communication frame that has a predetermined length and stores the second data; and
controlling the length of the communication frame in accordance with the priority level of the first data.

14. The communication method according to claim 13, wherein a length of the communication frame is controlled in accordance with the predetermined priority level of the second data.

15. The communication method according to claim 13, wherein, when the priority level of the first data is a high priority level, the length of the communication frame is controlled in accordance with delay information requested for the highest priority level in the transmission channel.

16. The communication method according to claim 12, wherein the fixed wait time is controlled in accordance with the predetermined priority level of the second data.

17. The communication method according to claim 12,
wherein the back-off time includes a randomly determined time for each transmission and the fixed wait time includes a time determined at a constant value; and
wherein the fixed wait time is controlled in accordance with at least one of the priority level of the first data and the predetermined priority level of the second data.

18. The communication method according to claim 17, wherein, when the priority level of the first data is lower than the predetermined priority level of the second data, the fixed wait time is set to zero.

19. The communication method according to claim 17, wherein the fixed wait time used when the second data whose predetermined priority level is not a high priority level are transmitted is set to a value that is greater than a maximum value of the back-off time used at the time of transmission of the first data having the highest priority level.

20. The communication method according to claim 12, wherein the transmission channel is a power line.

21. The communication method according to claim 12, wherein the priority level is acquired by analysis of a header of data that are present in the transmission channel.

22. The communication method according to claim 12, wherein control information transmitted from another communication apparatus which is connected to the transmission channel is received and the priority 1 level contained in the control information is acquired.

23. An integrated circuit used in a communication apparatus, which implements carrier sense multiple access (CSMA), for connecting to a transmission channel capable of transmitting a plurality of types of data, including first data and second data, having different priority levels, the circuit comprising:
an acquisition section that acquires a priority level of the first data on the transmission channel;
a transmission controller that controls a fixed wait time of the second data having a predetermined priority level, the fixed wait time being determined by comparing the predetermined priority level with the priority level of the first data; and
a transmitter that transmits the second data after transmission of the first data ends, and a back off time and the fixed wait time elapse.

* * * * *